(12) United States Patent
Song et al.

(10) Patent No.: US 8,106,981 B2
(45) Date of Patent: Jan. 31, 2012

(54) IMAGE PHOTOGRAPHING APPARATUS AND METHOD USING DIFFERENT INTENSITY SENSORS

(75) Inventors: Hyun-chul Song, Seoul (KR); Won-hee Choe, Gyeongju-si (KR); Seong-deok Lee, Suwon-si (KR); Jae-hyun Kwon, Yongin-si (KR); Kang-eui Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 12/078,651

(22) Filed: Apr. 2, 2008

(65) Prior Publication Data

US 2008/0297609 A1 Dec. 4, 2008

(30) Foreign Application Priority Data

May 30, 2007 (KR) ........................ 10-2007-0052839

(51) Int. Cl.
 H04N 3/14 (2006.01)
 H04N 5/335 (2011.01)
 H04N 5/238 (2006.01)
(52) U.S. Cl. ........................ 348/297; 348/364
(58) Field of Classification Search ............... None
 See application file for complete search history.

(56) References Cited

U.S. PATENT DOCUMENTS

| | | | | |
|---|---|---|---|---|
| 6,130,713 A * | 10/2000 | Merrill | ............ | 348/308 |
| 6,831,689 B2 * | 12/2004 | Yadid-Pecht | ............ | 348/297 |
| 6,831,692 B1 | 12/2004 | Oda | | |
| 6,927,796 B2 * | 8/2005 | Liu et al. | ............ | 348/297 |
| 6,963,370 B2 * | 11/2005 | DiCarlo et al. | ............ | 348/297 |
| 6,977,685 B1 * | 12/2005 | Acosta-Serafini et al. | ... | 348/308 |
| 7,701,499 B2 * | 4/2010 | Barnea et al. | ............ | 348/308 |
| 7,750,278 B2 * | 7/2010 | Oike et al. | ............ | 250/208.1 |

FOREIGN PATENT DOCUMENTS

| | | |
|---|---|---|
| JP | 11-150685 | 6/1999 |
| JP | 2005-051695 | 2/2005 |
| JP | 2005-332880 | 12/2005 |
| JP | 2006-018219 | 1/2006 |
| WO | 2006/061828 | 6/2006 |

OTHER PUBLICATIONS

Extended European Search Report issued Oct. 30, 2008 in corresponding European Patent Application No. 08152889.5.

* cited by examiner

*Primary Examiner* — Justin P Misleh
(74) *Attorney, Agent, or Firm* — Staas & Halsey LLP

(57) ABSTRACT

An image photographing apparatus and method, and more particularly, an image photographing apparatus and method that may divide each unit sensor of an image sensor into a high-sensitivity sensor and a low-sensitivity sensor and sense an incident optical signal using the high-sensitivity sensor and the low-sensitivity sensor. The image photographing apparatus may include a light reception unit receiving an optical signal, a sensor unit sensing the optical signal, which is incident to a pixel region, using a plurality of sensors with different sensitivity and converting the sensed optical signal into a plurality of electrical signals, and a signal extraction unit extracting the quantity of accumulated electric charge for the optical signal, which was sensed by each of the sensors, with reference to each of the electrical signals.

21 Claims, 6 Drawing Sheets

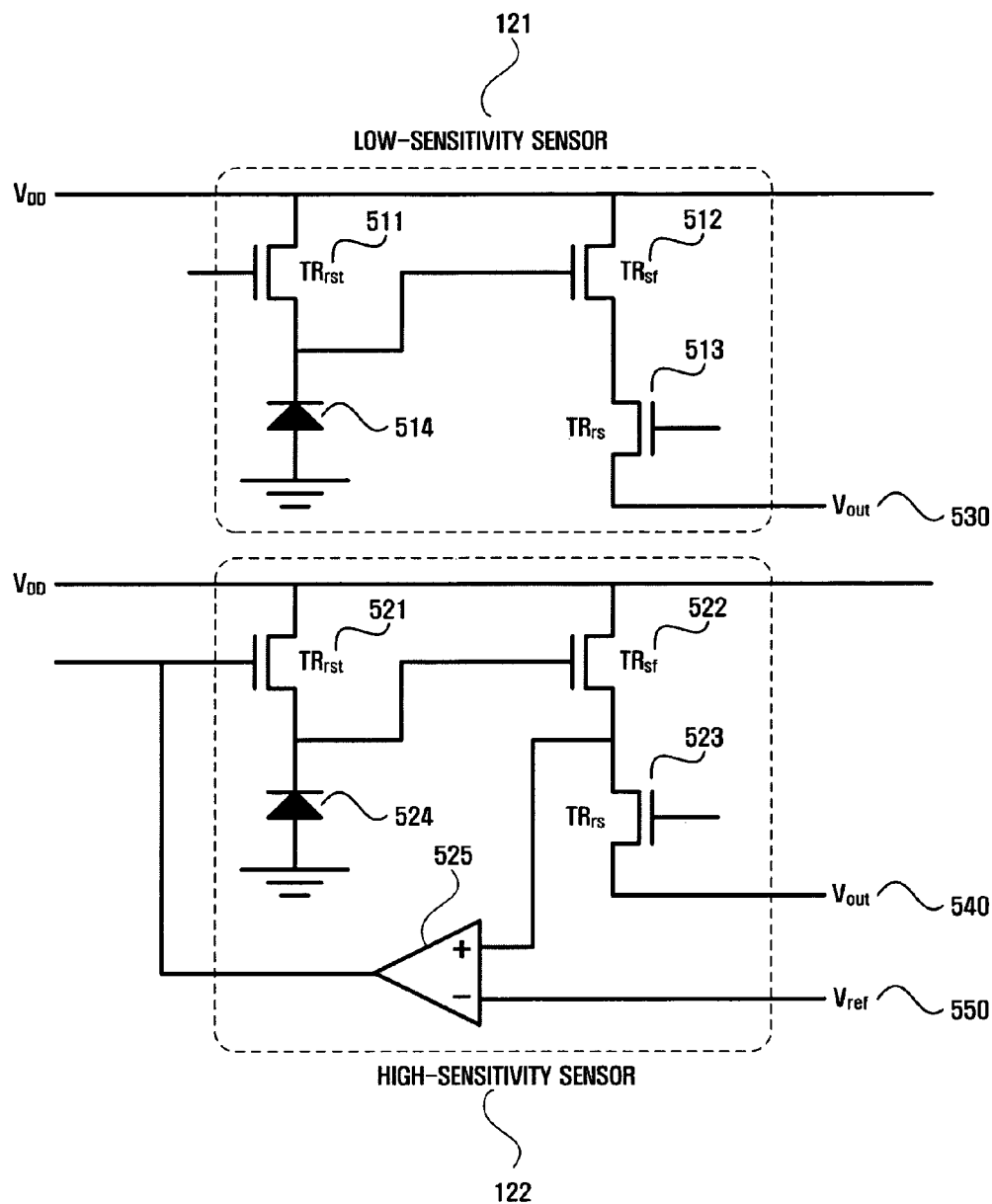

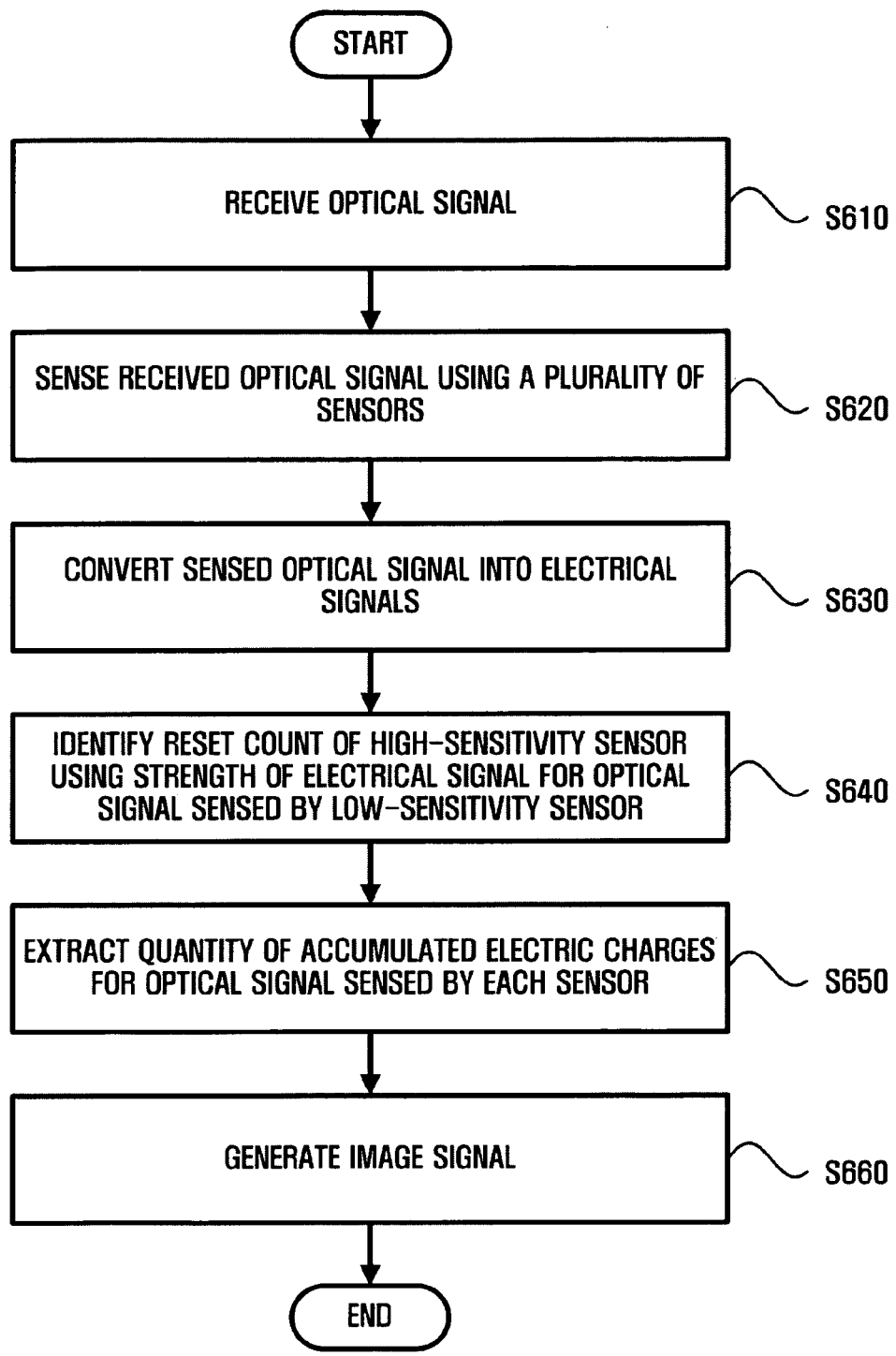

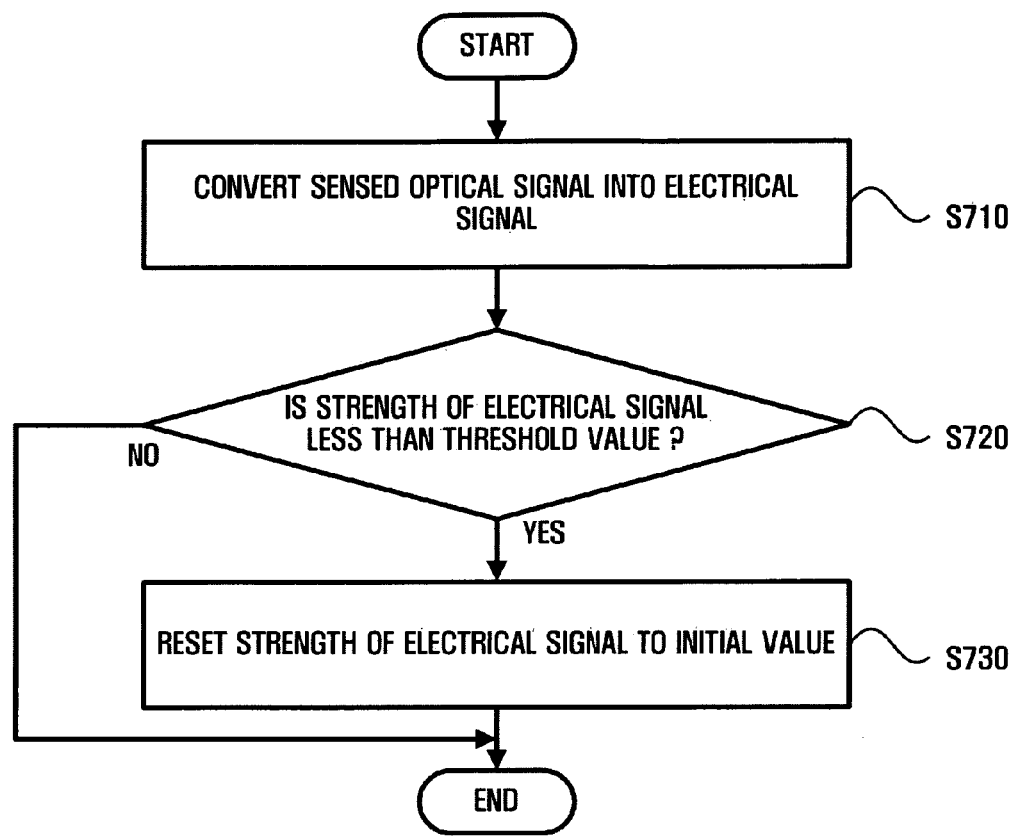

IMAGE PHOTOGRAPHING APPARATUS AND METHOD USING DIFFERENT INTENSITY SENSORS

CROSS-REFERENCE TO RELATED APPLICATIONS

This application claims priority from Korean Patent Application No. 10-2007-0052839 filed on May 30, 2007 in the Korean Intellectual Property Office, the disclosure of which is incorporated herein by reference in its entirety.

BACKGROUND

1. Field

One or more embodiments of the present invention relate to an image photographing apparatus and method, and more particularly, to an image photographing apparatus and method where unit sensors of an image sensor are divided into a high-sensitivity sensor and a low-sensitivity sensor and sense an incident optical signal using the high-sensitivity sensor and the low-sensitivity sensor.

2. Description of the Related Art

Apparatuses relying on image capturing devices, such as apparatuses with built-in cameras, including digital cameras and camera phones, have been widely used.

In general, such a camera includes a lens and an image sensor. The lens collects an optical signal reflected from a subject, and the image sensor detects the optical signal collected by the lens and converts the detected optical signal into an electrical image signal. Image sensors are largely classified into camera tubes and solid-state image sensors. Major examples of the solid-state image sensors include charge coupled devices (CCDs) and complementary metal oxide silicons (CMOSes).

In an image sensor, a dynamic range is defined as the range of intensities of an optical signal that can be sensed by the image sensor. The extent of the dynamic range determines whether a strong optical signal or weak optical signal can been sensed. For example, if the image sensor has a narrow dynamic range, it cannot sense the entire intensity of an incident optical signal. As a result, an image that is too bright or too dark is generated.

To ensure proper image detection, the dark and bright portions of an image can be distinguished by adjusting the exposure time of an incident optical signal. However, the adjustment of the exposure time alone is not sufficient to generate an image with an expanded dynamic range, i.e., the adjustment of the exposure time may not by itself compensate for a narrow dynamic range of an image sensor. That is, in order to maintain a signal level and implement an expanded dynamic range, the exposure time may be reduced when a strong optical signal is received and may be increased when a weak optical signal is received. However, when a strong optical signal and a weak optical signal are received simultaneously, the adjustment of the exposure time is not sufficient to maintain the signal level.

Therefore, it is desirable to expand the dynamic range. Accordingly, an image sensor using a self-reset operation has being studied. In such an operation, the image sensor increases the capacity of accumulated electric charges by taking several exposures during a single frame, and thus expands the dynamic range of the image sensor.

Here, a corresponding light reception unit of such an image sensor using this self-reset operation outputs a signal value of a received optical signal. The output signal value decreases as electric charges for the optical signal are accumulated. Thereafter, if the output signal value is less than a preset threshold value, the light reception unit is then reset, and electric charges are accumulated and compared again. This process is thus repeated multiple times within a single frame. When charge accumulation for the entire frame has completed, i.e., the accumulation of light representative of a frame time length is completed, the total quantity of accumulated electric charge can be identified using the frequency of charge accumulation and a final signal value of the output signal. Based on the identified total quantity of accumulated electric charge, the intensity of the incident optical signal can be determined.

Such an image sensor using this self-reset operation includes a comparator in order to compare an output signal value to a preset threshold value and a counter in order to count the frequency of charge accumulations. In addition, the image sensor must include a memory in order to temporarily store the frequency of charge accumulation. That is, the image sensor has to include elements in addition to those of a conventional image sensor. Accordingly, the size of a unit sensor representing a pixel may be increased over conventional sensors. Similarly, the number of output ports attached to the unit sensor may also have to be increased.

SUMMARY

One or more embodiments of the present invention provides an image photographing apparatus and method where unit sensors of an image sensor are divided into a high-sensitivity sensor and a low-sensitivity sensor, such that by sensing an incident optical signal using the high-sensitivity sensor and the low-sensitivity sensor, an intensity of a received signal can be determined by the quantity of electric charge accumulated by the high-sensitivity sensor and by the signal value output from the low-sensitivity sensor.

Additional aspects and/or advantages will be set forth in part in the description which follows and, in part, will be apparent from the description, or may be learned by practice of the invention.

To achieve the above and/or other aspects and advantages, embodiments of the present invention include an image photographing apparatus, including a sensor unit to optically sense a light beam incident on a sub-defined region of the sensor unit, of a plurality of sub-defined regions of the sensor unit, with the sub-defined region including a plurality of sensors with at least two different sensitivities, and to convert the sensed light beam into a plurality of electrical signals respectively corresponding to at least the plurality of sensors, and a signal extraction unit to extract a quantity of accumulated electric charge performed by at least one of the plurality of sensors, with reference to each of the electrical signals, to output at least one signal representative of an intensity of the sub-defined region based upon the extracted quantity of accumulated electric charge.

To achieve the above and/or other aspects and advantages, embodiments of the present invention include an image photographing method, including optically sensing a light beam incident on a sub-defined region of a corresponding senor unit, of a plurality of sub-defined regions of the sensor unit, and sensing the incident light beam with at least two different sensitivities, converting the sensed incident light beam into a plurality of electrical signals respectively corresponding to the at least two different sensitivities, and extracting a quantity of accumulated electric charge performed in a first sensing of the sensing of the incident light beam with one of the at least two different sensitivities, with reference to each of the plurality of electrical signals.

To achieve the above and/or other aspects and advantages, embodiments of the present invention include an image photographing apparatus for a sensor unit for optically sensing light beams incident on a plurality of sub-defined regions of the sensor unit, including a sub-defined region of the sensor unit, of the plurality of sub-defined regions, to sense a light beam incident on the sub-defined region, including a plurality of sensors with at least two different sensitivities to respectively convert sensed light into a plurality of electrical signals, with the different sensitivities being set such that an extracted quantity of accumulated electric charge performed by a first of the plurality of sensors in combination with information of a second of the plurality of sensors is determinative of an intensity of the sensed light beam, and such that a resetting of the first of the plurality of sensors is performed at least twice during a defined period of time, for a determining of the intensity of the sensed light beam, and a resetting of the second of the plurality of sensors is performed a number of times, during the defined period of time, different from a number of times the resetting of the first of the plurality of sensors is performed, for the determining of the intensity of the sensed light beam.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 illustrates a high-sensitivity sensor and a low-sensitivity sensor, according to an embodiment of the present invention;

FIG. 6 illustrates an image photographing process, according to an embodiment of the present invention; and FIG. 7 illustrates an operation of a high-sensitivity sensor, according to an embodiment of the present invention.

DETAILED DESCRIPTION OF THE EMBODIMENTS

Figure 1:
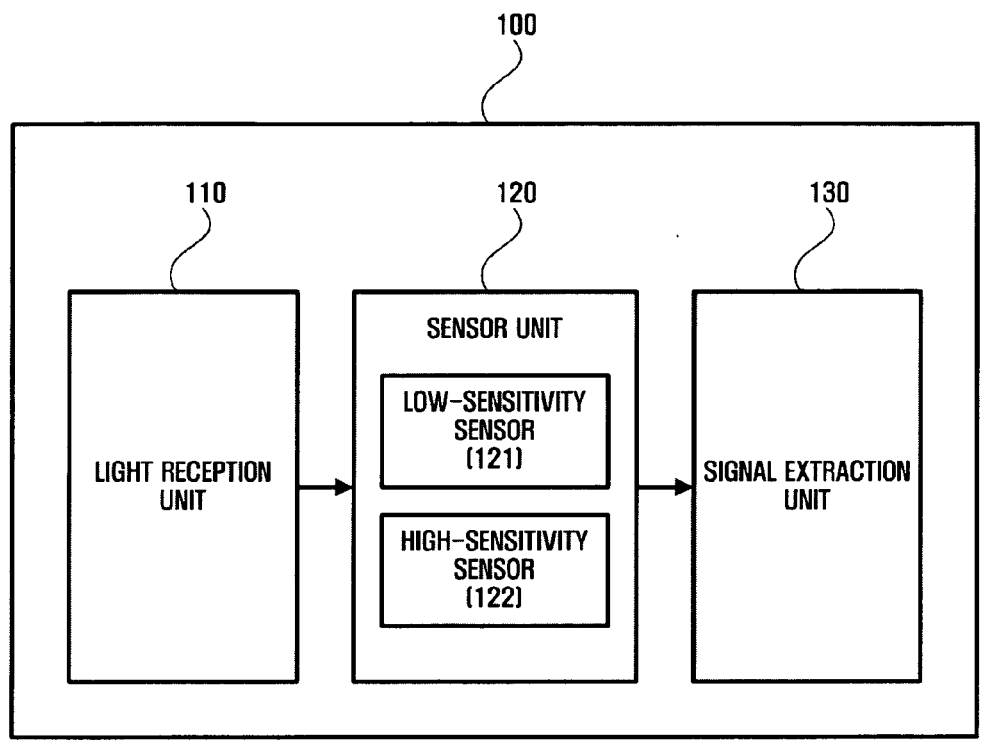
FIG. 1 illustrates an image photographing apparatus, according to an embodiment of the present invention.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an image photographing apparatus 100, according to an embodiment of the present invention. Referring to FIG. 1, the image photographing apparatus 100 may include a light reception unit 110, a sensor unit 120, and a signal extraction unit 130, for example.

The light reception unit 110 may receive optical signals. To this end, in an embodiment, the light reception unit 110 may include a lens unit (not shown) and a filter unit (not shown), for example.

The lens unit may further include one or more lenses collecting incident light, with the number of lenses varying according to differing embodiment purposes and needs. In addition, the lenses may be arranged in various forms on a same plane. For example, the lenses may be arranged in a row or column or in a matrix with rows×columns, for example, noting that alternatives are also available. The lenses may focus light beams onto the sensor unit 120 or sub-divided regions within the sensor unit 120, with potentially each sub-divided region, in an embodiment, corresponding to a single pixel, for example.

The filter unit may filter the optical signals collected by the lens unit, for example. That is, such a filter unit, in an embodiment, may pass an optical signal having a predetermined wavelength band among the optical signals collected by the lens unit.

The sensor unit 120 may sense an optical signal, which is incident on a pixel region of the optical sensor, for example, using a plurality of sensors with different sensitivities and convert the sensed optical signal into a plurality of respective electrical signals. That is, the sensor unit 120 may sense an optical signal, which is incident to each pixel region, using a plurality of sensors. The sensors may have different sensitivity and may each, for example, include a high-sensitivity sensor 122 and a low-sensitivity sensor 121.

Thus, in an embodiment, each of the high-sensitivity sensor 122 and the low-sensitivity sensor 121 converts a respective incident optical signal into an electrical signal. The electrical signal discharges over time, and thus its amplitude decreases over time. Here, the speed at which the electrical signal discharges in the high-sensitivity sensor 122 is different from the speed at which the electrical signal discharges in the low-sensitivity sensor 121. Accordingly, the electrical signal discharges faster in the low-sensitivity sensor 121 than the high-sensitivity sensor 122.

If the strength of the electrical signal for the optical signal sensed by the high-sensitivity sensor 122 decreases lower than a preset threshold value, or meets such a preset threshold value, it is reset to an initial value, and the electrical signal again discharges. This discharge process can be repeated over the time of a frame using repeated observed sequences of incident optical signals, for example. The high-sensitivity sensor 122 will be described in greater detail below with reference to FIG. 2.

The signal extraction unit 130 may extract the quantity of accumulated electric charge for the optical signal, as sensed by each of the sensors, with reference to each electrical signal received from the sensor unit 120.

The signal extraction unit 130 may further extract the quantity of accumulated electric charge for the optical signal, as sensed by the high-sensitivity sensor 122, by using the number of times (hereinafter, referred to as reset count) that the amplitude of the electrical signal was reset in the high-sensitivity sensor 122 during the capturing of the information of a frame, for example, using incident optical signals and by using a final value of the electrical signal output from the high-sensitivity sensor 122. In this case, according to an embodiment, the reset count may be set with reference to the amplitude of the electrical signal for the optical signal sensed by the low-sensitivity sensor 121, for example. The setting of reset count for the high-sensitivity sensor 122 will be described in greater detail below with reference to FIG. 3.

If the quantity of electric charge for the optical signal, sensed by each of the high-sensitivity sensor 122 and the low-sensitivity sensor 121, is extracted, the signal extraction unit 130 may generate an image signal corresponding to the optical signal incident on the corresponding pixel region, using the extracted quantity of electric charge. That is, the signal extraction unit 130 may generate an image signal for a corresponding pixel using information regarding a bright region of the pixel and information regarding a dark region of the pixel. Here, since the signal extraction unit 130 generates an image signal using the quantity of electric charge that is extracted through the repeated discharge and reset processes, it can generate an image with a high dynamic range.

Figure 2:
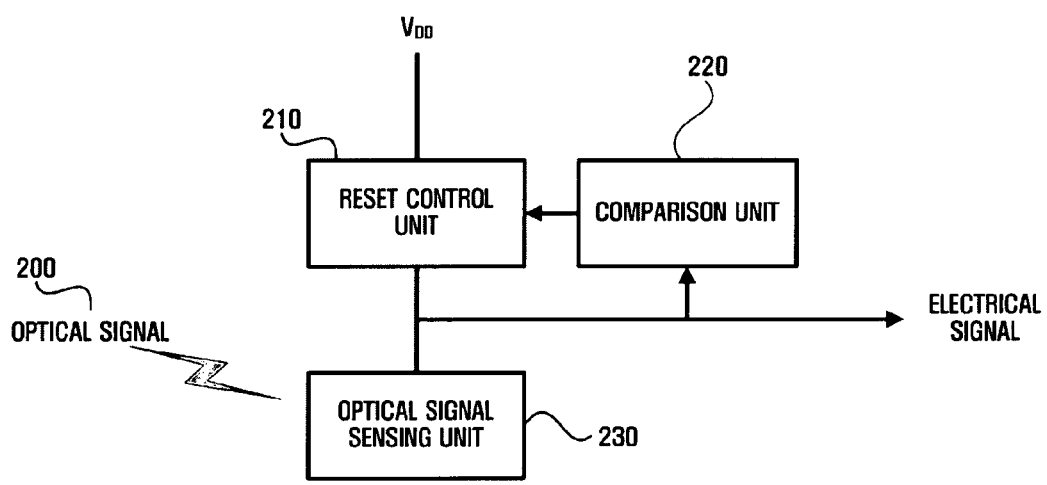
FIG. 2 illustrates a high-sensitivity sensor, such as that illustrated in FIG. 1, according to an embodiment of the present invention.

FIG. 2 illustrates a high-sensitivity sensor 122, as illustrated in FIG. 1, according to an embodiment of the present invention. Referring to FIG. 2, the high-sensitivity sensor 122 may include a reset control unit 210, a comparison unit 220, and an optical signal sensing unit 230, for example.

The optical signal sensing unit 230 may sense an incident optical signal 200 and convert the sensed optical signal 200 into an electrical signal. Then, the optical signal sensing unit 230 may transmit the electrical signal (hereinafter, referred to as a first electrical signal) of the high-sensitivity sensor 122 to the comparison unit 220.

In an embodiment, the comparison unit 220 may compare the amplitude of the first electrical signal to a preset threshold value, for example. As the first electrical signal decreases over time, its strength may be reduced from a specified initial value. The threshold value may also be set according to which of a plurality of threshold ranges the amplitude of an electrical signal (hereinafter, referred to as a second electrical signal) output from the low-sensitivity sensor 121 falls within.

When all optical signals required/desired to generate a frame, for example, has been incident, the second electrical signal output from the low-sensitivity sensor 121 may discharge over time, resulting in the amplitude of the second electrical signal being reduced. Therefore, the second electrical signal may fall within one of a plurality of predetermined threshold ranges. Here, the signal extraction unit 130 may, thus, identify the threshold range to which the second electrical signal belongs and extract the reset count for the high-sensitivity sensor 122. In this case, the greater the threshold range, the smaller the threshold value. Conversely, the lower the threshold range, the greater the threshold value, for example.

If the comparison result of the comparison unit 220 indicates that the amplitude of the first electrical signal is less than a threshold value, or meets the threshold value, the reset control unit 210 may reset the optical signal sensing unit 230, and thus reset the amplitude of the first electrical signal to an initial value.

As the first electrical signal of the high-sensitivity senor 122, whose amplitude was reset to the initial value starts to discharge again, the strength of the first electrical signal becomes reduced over time. This discharging process can be repeated until all optical signals required/desired to form the information for a frame, for example, are received.

Figure 3:
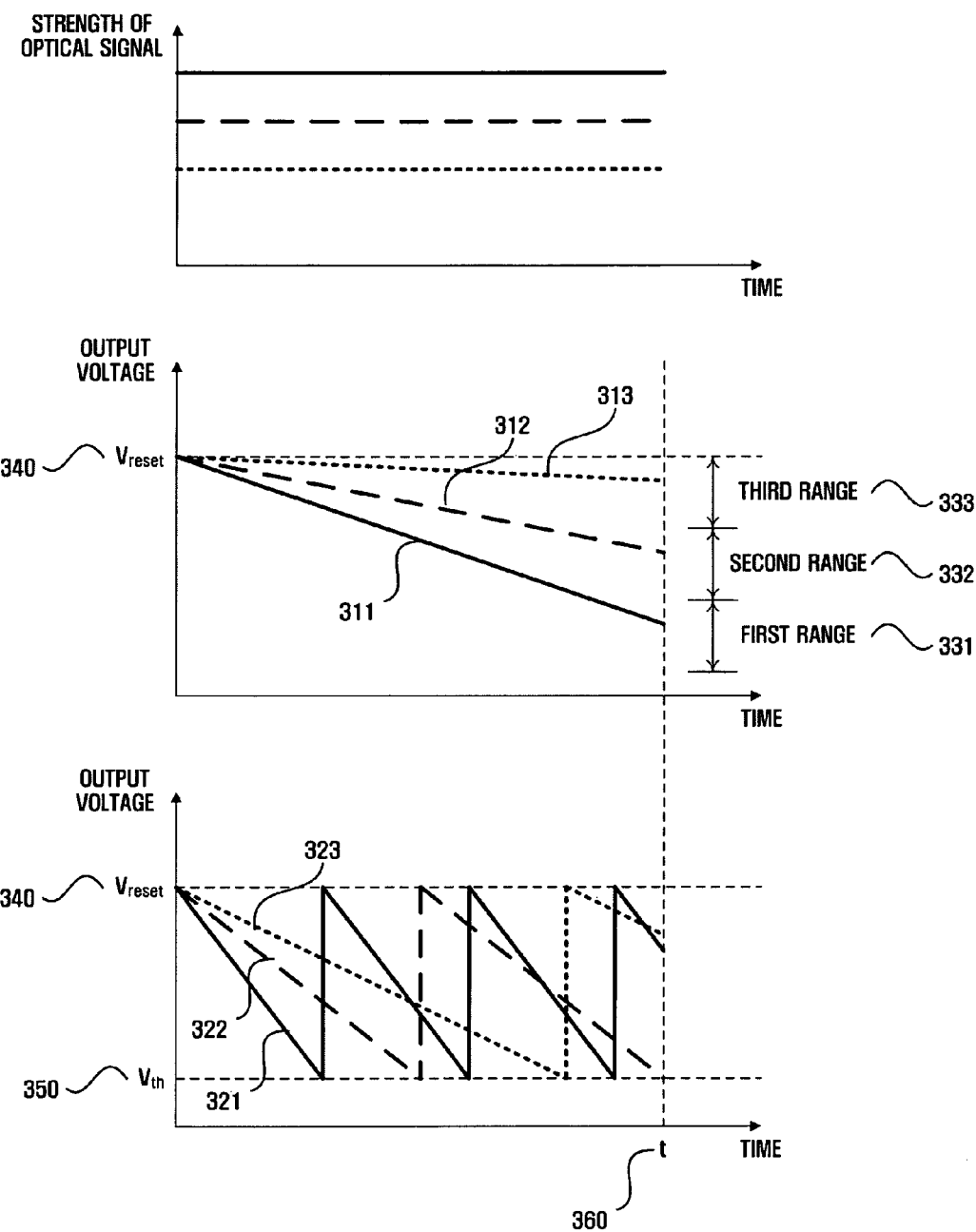
FIG. 3 illustrates electrical signals for both an optical signal sensed by a high-sensitivity sensor and a low-sensitivity sensor, according to an embodiment of the present invention.

FIG. 3 illustrates electrical signals for an optical signal sensed by the high-sensitivity sensor 122 and the low-sensitivity sensor 121, according to an embodiment of the present invention.

As described above, the high-sensitivity sensor 122 and the low-sensitivity sensor 121 have different sensitivity. Accordingly, the corresponding first and second electrical signals discharge at different speeds from an initial value 340. That is, the first electrical signal output from the high-sensitivity sensor 122 discharges at a high speed, while the second electrical signal output from the low-sensitivity sensor 121 discharges at a low speed.

The speed at which the electrical signal (the first electrical signal or the second electrical signal) output from the high-sensitivity sensor 122 and the low-sensitivity sensor 121 may vary depends on the intensity of an incident optical signal.

That is, if the intensity of the incident optical signal is high, the electrical signal discharges at a high speed. Conversely, if the intensity of the incident optical signal is low, the electrical signal discharges at a low speed.

In FIG. 3, each of the illustrated signals 311 through 313 represent the second electrical output from the low-sensitivity sensor 121 according to the respective intensity of an incident optical signal. The second electrical signal falls within one of first through third threshold ranges 331 through 333 at a time t (360), for example, when all optical signals required to form a frame are incident. That is, the illustrated signals 311 through 313 respectively fall within the first through third threshold ranges 331 through 333.

Still further, in FIG. 3, each of the illustrated signals 321 through 323 represent the first electrical signal output from the high-sensitivity sensor 122 according to the respective intensity of an incident optical signal. The first electrical signal may then be repeatedly discharged and reset a number of times before the time t (360) when all optical signals required/desired to form a frame, for example, have been incident on the sensor. Here, the reset process for the high-sensitivity sensor 122 may be performed based on the comparison result of the comparison unit 220. That is, as the first electrical signal discharges from the initial value 340, its amplitude becomes reduced. The comparison unit 220 may identify whether the decreasing amplitude of the first electrical signal becomes less than, or meets, a threshold value 350 and control the reset control unit 210 to perform the reset process based on the identification result.

These discharge and reset processes may be performed from a time when an initial optical signal is incident to the time t (360), for example, and the reset count may further increase as the intensity of an incident optical signal increases. That is, the reset count of the illustrated signal 321, which represents the first electrical signal when the intensity of an incident optical signal is relatively high, may be higher than that of the second or third illustrated signals 322 or 323.

Using output values of the first and second electrical signals, the signal extraction unit 130 may extract the quantity of electric charge accumulated by each of the high-sensitivity sensor 122 and the low-sensitivity sensor 121. In an embodiment, the signal extraction unit 130 may extract the quantity of electric charge of the high-sensitivity sensor 122 based on the second electrical signal at the time t (360) from the low-sensitivity sensor 121. The signal extraction unit 130 may identify the reset count of the first electrical signal using the threshold range in which the second electrical signal falls within at the time t (360), for example, and may then extract the quantity of accumulated electric charge from the high-sensitivity sensor 122 using the identified reset count and the strength of the first electrical signal at the time t (360).

To this end, in an embodiment, the signal extraction unit 130 may use a table specifying the relationship between threshold range and reset count, and the image photographing apparatus 100 may include a storage unit (not shown) storing the table, for example.

Figure 4:
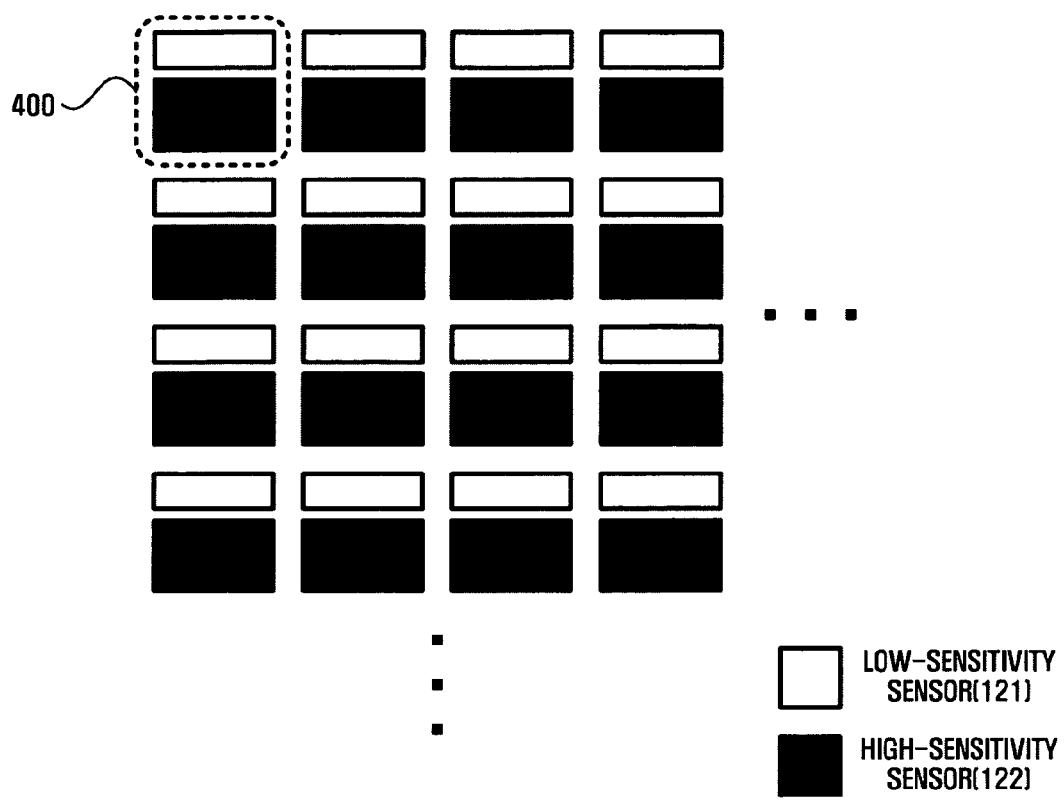
FIG. 4 illustrates an arrangement plan for high-sensitivity sensors and low-sensitivity sensors, according to an embodiment of the present invention.

FIG. 4 is an arrangement plan of a high-sensitivity sensor 122 and a low-sensitivity sensor 121, according to an embodiment of the present invention.

As illustrated, in an embodiment, each sensor group 400 of the high-sensitivity sensor 122 and the low-sensitivity sensor 121 may be formed in each pixel, for example. That is, referring to FIG. 4, here each pixel includes the high-sensitivity sensor 122 and the low-sensitivity sensor 121, which may be adjacent to each other and may be representative of each pixel. Therefore, two separate sensors, that is, the high-sensitivity sensor 122 and the low-sensitivity sensor 121, may correspond to each other in each pixel.

The high-sensitivity sensor 122 and the low-sensitivity sensor 121 may be arranged in various ways. In FIG. 4, the high-sensitivity sensor 122 and the low-sensitivity sensor 121 are shown arranged parallel to each other in a vertical direction form each of the sensor groups 400, with the sensor groups 400 of the same pattern being repeatedly arranged in each row and column.

FIG. 5 illustrates a high-sensitivity sensor 122 and a low-sensitivity sensor 121 included in a pixel region, according to an exemplary embodiment of the present invention.

Referring to FIG. 5, the illustrated low-sensitivity sensor 121 may include an optical signal sensing diode 514 and three transistors, for example. The three transistors may include a reset transistor 511, a source follower 512, and a row selection transistor 513, for example.

The reset transistor 511 may reset the optical signal sensing diode 514. Here, the optical signal sensing diode 514 may receive an optical signal and output an initial electrical signal, for example. As the output electrical signal discharges, its amplitude reduces. When reset by the reset transistor 511, the optical signal sensing diode 514 may output an initial electrical signal again. In one embodiment, the reset transistor 511 only resets the optical signal sensing diode 514 when all optical signals required/desired to form a frame, for example, are received, noting that alternatives are also available.

The electrical signal output from the optical signal sensing diode 514 may further be transmitted to the source follower 512, which amplifies the received electrical signal. Then, the row selection transistor 513 may determine whether to output the amplified electrical signal. Consequently, an output electrical signal 530, e.g., the above-mentioned second electrical signal, is transmitted to the above-mentioned signal extraction unit 130.

The illustrated high-sensitivity sensor 122 may include an optical signal sensing diode 524, three transistors, and a comparator 525, for example. The three transistors may include a reset transistor 521, a source follower 522, and a row selection transistor 523, also as an example. In an embodiment, the optical signal sensing diode 524, the reset transistor 521, the source follower 522, and the row selection transistor 523 of the high-sensitivity sensor 122 are similar to respective elements of the low-sensitivity sensor 121, and thus a detailed description thereof will be further omitted, noting that alternatives are equally available.

The comparator 525 of the high-sensitivity sensor 122 may compare the amplitude corresponding to the illustrated electrical signal 540, e.g., the above-mentioned first electrical signal, as output from the source follower 522, to an input threshold value 550. If the strength of this signal, as output from the source follower 522, is less than, or meets, the threshold value 550, the comparator 525 may transmits a reset signal to the reset transistor 521. Accordingly, the reset transistor 521 may reset the optical signal sensing diode 524.

The row selection transistor 523 may output this electrical signal received from the source follower 522 in response to a selection signal. Electrical signals 540 and 530, respectively as the first and second electrical signals, output from the high-sensitivity sensor 122 and the low-sensitivity sensor 121, and may be transmitted to the aforementioned signal extraction unit 130 and used to generate an image signal.

FIG. 6 illustrates an image photographing process, according to an embodiment of the present invention.

Referring to FIG. 6, an optical signal may be received, in operation S610. For example, the optical reception unit 110 of the image photographing apparatus 100 may receive an optical signal, in order to expand a dynamic range, and sense the optical signal.

The received optical signal may then be sensed by a plurality of sensors with different sensitivities, in operation S620. For example, the received optical signal may be transmitted to the sensor unit 120, and the sensor unit 120 may sense the received optical signal using a plurality of sensors with different sensitivity. In this case, such sensors may include the high-sensitivity sensor 122 and the low-sensitivity sensor 121.

The sensed optical signal may be converted into a plurality of electrical signal by the plurality of sensors, in operation S630. For example, the sensor unit 120 may convert the sensed optical signal into a plurality of electrical signals, and output the electrical signals. Here, the output electrical signals may be transmitted to the signal extraction unit 130. Further, in this example, the electrical signals respectively output from the high-sensitivity sensor 122 and the low-sensitivity sensor 121 are separately transmitted to the signal extraction unit 130.

Thereafter, a reset count for at least one of the plurality of sensors may be identified using information from another of the plurality of sensors, such as the amplitude of a resultant of the other plurality of sensors, in operation S640. For example, after receiving the electrical signals, the signal extraction unit 130 may identify a reset count of the high-sensitivity sensor 122 using the amplitude of the electrical signal for the optical signal sensed by the low-sensitivity sensor 121, in operation S640. Such an operation of identifying and implementing reset operations may be further repeated. For example, the high-sensitivity sensor 122 may repeatedly discharge and reset the electrical signal, and the signal extraction unit 130 may extract the reset count at a time when all optical signals required/desired to form a frame, for example, have been received, noting that alternatives are equally available.

The quantity of accumulated electric charge for the optical signal sensed by each of the sensors may be extracted, in operation S650, and an image signal using the extracted quantity of accumulated electric charge may be generated, in operation S660.

When all optical signals required/desired to form a frame, for example, have been received, the high-sensitivity sensor 122 and the low-sensitivity sensor 121 may further be reset, for example. Accordingly, then the high-sensitivity sensor 122 and the low-sensitivity sensor 121 may repeat the above operations.

FIG. 7 illustrates an operation of a high-sensitivity sensor 122, according to an embodiment of the present invention.

Referring to FIG. 7, a sensed optical signal may be converted into an electrical signal, e.g., by the optical signal sensing unit 230, of the high-sensitivity sensor 122, in operation S710. As the electrical signal discharges, its amplitude becomes reduced. Accordingly, for example, the electrical signal may then be transmitted to the signal extraction unit 130 and the comparison unit 220. Thereafter, it may be determined whether the amplitude of the received electrical signal is less than, or meets, a preset threshold value, e.g., by the comparison unit 220, in operation S720.

If the amplitude of the electrical signal is less than, or meets, the preset threshold value, the electrical signal can be reset to an initial value, in operation S730.

The above operations may be repeated until all optical signals required/desired to form a frame, for example, have been received.

As described above, an image photographing apparatus and method, according to one or more embodiments of the present invention, may provide the following advantages.

Each unit sensor of an image sensor, which senses a pixel, for example, may be divided into a high-sensitivity sensor and a low-sensitivity sensor and an incident optical signal may be sensed, thereby expanding a dynamic range.

Further, since the quantity of electric charge accumulated by the high-sensitivity sensor may be identified using a value of a signal output from the low-sensitivity sensor, structures of a corresponding image photographing apparatus and method can be simplified.

Herein, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could be a single processing element or implemented through a distributed network, noting that additional and alternative embodiments are equally available.

Thus, while aspects of the present invention has been particularly shown and described with reference to differing embodiments thereof, it should be understood that these exemplary embodiments should be considered in a descriptive sense only and not for purposes of limitation. Any narrowing of functionality or capability of an aspect in one embodiment should not considered as a respective narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An image photographing apparatus, comprising:
a sensor unit to optically sense a light beam incident on a sub-defined region of the sensor unit, of a plurality of sub-defined regions of the sensor unit, with the sub-defined region including a plurality of sensors with at least two different sensitivities, and to convert the sensed light beam into a plurality of electrical signals respectively corresponding to at least the plurality of sensors; and
a signal extraction unit to extract a quantity of accumulated electric charge performed by at least one of the plurality of sensors, with reference to each of the plurality of electrical signals, to output at least one signal representative of an intensity of the sub-defined region based upon the extracted quantity of accumulated electric charge,
wherein the extracted quantity of accumulated electric charge performed by a first sensor, of the at least one of the plurality of sensors, is based upon an amplitude of an electrical signal of a second sensor, of the plurality of sensors, in a same frame,
wherein the first sensor comprises an optical signal sensing unit to convert the sensed light beam into a first electrical signal and a reset control unit to reset the first electrical signal of the optical signal sensing unit to an initial value based upon a review of the first electrical signal, with the first electrical signal discharging over time such that the first electrical signal reduces in amplitude from the initial value over time, and
wherein the signal extraction unit extracts the quantity of accumulated electric charge for the first sensor using a determined frequency of resets of the first electrical signal performed within a period of time corresponding to a frame information being generated using the sensed light beam, using a final value of the first electrical signal at an end of the period of time in defining the at least one signal, and extracts a frequency of resets with reference to the amplitude of the electrical signal of the second sensor, with the second sensor having a different sensitivity from the first sensor.

2. The apparatus of claim 1, further comprising a light reception unit to receive the light beam and to provide the received light beam to the sensor unit.

3. The apparatus of claim 1, further comprising a light reception unit to receive the light beam and to provide the received light beam to the sub-divided region of the sensor unit.

4. The apparatus of claim 1, wherein the sub-defined region corresponds to a single pixel of a plurality of pixels of the sensor unit.

5. The apparatus of claim 1, further comprising:
a comparison unit to compare an amplitude of the first electrical signal to a preset threshold value; and
the reset control unit resets the first electrical signal to the initial value based upon a result of the comparison unit indicating that the amplitude of the first electrical signal fails to meet the preset threshold value.

6. The apparatus of claim 1, wherein the signal extraction unit extracts the frequency of resets with reference to a determination of which of a plurality of preset strength ranges the amplitude of the electrical signal of the second sensor falls within.

7. The apparatus of claim 1, wherein the second sensor performs a reset operation of the electrical signal of the second sensor to an initial value of the electrical signal of the second sensor only once during a period of time corresponding to the quantity of accumulated electric charge performed by the first sensor.

8. The apparatus of claim 1, wherein the apparatus is a camera and the light sensor unit is a CCD or CMOS light sensor.

9. An image photographing method, comprising:
optically sensing a light beam incident on a sub-defined region of a corresponding sensor unit, of a plurality of sub-defined regions of the sensor unit, and sensing the incident light beam with at least two different sensitivities;
converting the sensed incident light beam into a plurality of electrical signals respectively corresponding to the at least two different sensitivities; and
extracting a quantity of accumulated electric charge performed in a first sensing of the sensing of the incident light beam with one of the at least two different sensitivities, with reference to each of the plurality of electrical signals, wherein an extracted quantity of accumulated electric charge performed by the first sensing is based upon an amplitude of an electrical signal of a second sensing, in a same frame, wherein the converting of the sensed light beam into a plurality of electrical signals comprises converting the sensed light beam into a first electrical signal and resetting the first electrical signal to an initial value based upon a review of the first electrical signal, with the first electrical signal discharging over time such that the first electrical signal reduces in amplitude from the initial value over time, and wherein the extracting of the quantity of accumulated electric charge further comprises extracting the quantity of accumulated electric charge using a determined frequency of resets of the first electrical signal performed within a period of time corresponding to a frame information being generated using the sensed light beam, using a final value of the first electrical signal at an end of the period of time in defining a signal representative of an intensity of at least the sub-defined region, and extracting the frequency of resets with reference to the amplitude of the electrical signal of the second sensing, with the electrical signal of the second sensing corresponding to light sensing with a different sensitivity from a light sensitivity corresponding to the first electrical signal.

10. The method of claim 9, further comprising receiving the light beam and providing the received light beam to the sensor unit.

11. The method of claim 9, further comprising receiving the light beam and providing the received light beam to the sub-divided region of the sensor unit.

12. The method of claim 9, wherein the sub-defined region corresponds to a single pixel of a plurality of pixels of the sensor unit.

13. The method of claim 9, wherein the sensing of the incident light beam with the at least two different sensitivities further comprises sensing the incident light beam with a first sensor to perform the first sensing having a first sensitivity and a second sensor to perform the second sensing having a second sensitivity.

14. The method of claim 9, further comprising outputting at least one signal representative of an intensity of at least the sub-defined region based upon the extracted quantity of accumulated electric charge.

15. The method of claim 9, further comprising:
comparing an amplitude of the first electrical signal to a preset threshold value; and
the resetting of the first electrical signal further comprises resetting the first electrical signal to the initial value based upon a result of the comparing of the amplitude of the first electrical signal indicating that the amplitude of the first electrical signal fails to meet the preset threshold value.

16. The method of claim 9, wherein the extracting of the frequency of resets further comprises extracting the frequency of resets with reference to a determination of which of a plurality of preset strength ranges the amplitude of the electrical signal of the second sensing falls within.

17. The method of claim 9,
wherein the first sensing of the incident light beam is reset a first number of times during the period of time corresponding to the frame information; and
the method further comprises resetting the second sensing a second number of times during the period of time corresponding to the frame information using the sensed light beam of the sub-divided region,
with the first number of times being different from the second number of times.

18. The method of claim 17, wherein the second number of times is 1.

19. An image photographing apparatus for a sensor unit for optically sensing light beams incident on a plurality of sub-defined regions of the sensor unit, comprising:
a sub-defined region of the sensor unit, of the plurality of sub-defined regions, to sense a light beam incident on the sub-defined region, comprising a plurality of sensors with at least two different sensitivities to respectively convert sensed light into a plurality of electrical signals, with the different sensitivities being set such that an extracted quantity of accumulated electric charge performed by a first of the plurality of sensors is based on information of a second of the plurality of sensors that has a different sensitivity from the first of the plurality of sensors, and such that a resetting of the first of the plurality of sensors is performed at least twice during a defined period of time, for a determining of an intensity of the sensed light beam, and a resetting of the second of the plurality of sensors is performed a number of times, during the defined period of time, different from a number of times the resetting of the first of the plurality of sensors is performed, for the determining of the intensity of the sensed light beam,
wherein a frequency of resets of a first electrical signal, of the plurality of electrical signals, of the first of the plurality of sensors is extracted by referencing an amplitude of a second electrical signal, of the plurality of electrical signals, of the second of the plurality of sensors.

20. The apparatus of claim 19, wherein the sub-defined region corresponds to a single pixel of a plurality of pixels of the sensor unit.

21. An image photographing apparatus, comprising:
a sensor unit to optically sense a light beam incident on a sub-defined region of the sensor unit, of a plurality of sub-defined regions of the sensor unit, with the sub-defined region including a plurality of sensors with at least two different sensitivities, and to convert the sensed light beam into a plurality of electrical signals respectively corresponding to at least the plurality of sensors; and
a signal extraction unit to extract a quantity of accumulated electric charge performed by at least one of the plurality of sensors, with reference to each of the plurality of electrical signals, to output at least one signal representative of an intensity of the sub-defined region based upon the extracted quantity of accumulated electric charge,
wherein the signal extraction unit extracts a frequency of resets of a first electrical signal of a first sensor of the plurality of sensors by referencing an amplitude of a second electrical signal by a second sensor of the plurality of the sensors, with the second sensor having a different sensitivity from the first sensor, and extracts the quantity of accumulated electric charge based on the extracted frequency.

* * * * *

UNITED STATES PATENT AND TRADEMARK OFFICE
CERTIFICATE OF CORRECTION

| | |
|---|---|
| PATENT NO. | : 8,106,981 B2 |
| APPLICATION NO. | : 12/078651 |
| DATED | : January 31, 2012 |
| INVENTOR(S) | : Hyun-Chul Song et al. |

Page 1 of 1

It is certified that error appears in the above-identified patent and that said Letters Patent is hereby corrected as shown below:

Column 10, Line 64, In Claim 9, delete "sensing of the sensing of the" and insert -- sensing of the --, therefor.

Signed and Sealed this
Twenty-ninth Day of May, 2012

David J. Kappos
*Director of the United States Patent and Trademark Office*